US012496771B2

(12) United States Patent
Lefevere et al.

(10) Patent No.: US 12,496,771 B2
(45) Date of Patent: Dec. 16, 2025

(54) METHOD AND SYSTEM FOR MANUFACTURING THREE- DIMENSIONAL POROUS STRUCTURES

(71) Applicant: VITO NV, Mol (BE)

(72) Inventors: Jasper Lefevere, Mol (BE); Bart Michielsen, Mol (BE); Wim Bouwen, Mol (BE); Steven Mullens, Mol (BE); Marijn Gysen, Mol (BE)

(73) Assignee: VITO NV, Mol (BE)

( * ) Notice: Subject to any disclaimer, the term of this patent is extended or adjusted under 35 U.S.C. 154(b) by 584 days.

(21) Appl. No.: 17/570,030

(22) PCT Filed: Jul. 17, 2020

(86) PCT No.: PCT/EP2020/070342
§ 371 (c)(1),
(2) Date: Jan. 6, 2022

(87) PCT Pub. No.: WO2021/013745
PCT Pub. Date: Jan. 28, 2021

(65) Prior Publication Data
US 2023/0347577 A1    Nov. 2, 2023

(30) Foreign Application Priority Data
Jul. 19, 2019    (EP) .................................... 19187334

(51) Int. Cl.
*B29C 64/118*    (2017.01)
*B29C 64/182*    (2017.01)
(Continued)

(52) U.S. Cl.
CPC .......... *B29C 64/118* (2017.08); *B29C 64/182* (2017.08); *B29C 64/209* (2017.08);
(Continued)

(58) Field of Classification Search
CPC ... B29C 64/118; B29C 64/182; B29C 64/209; B29C 64/241; B29C 64/245; B33Y 10/00
See application file for complete search history.

(56) References Cited

U.S. PATENT DOCUMENTS 7,527,671 B1    5/2009  Stuecker et al.
2017/0232679 A1    8/2017  Gardiner et al.
(Continued)

FOREIGN PATENT DOCUMENTS

CN    109895390 A    6/2019
DE    102017007178 A1    2/2018
(Continued)

OTHER PUBLICATIONS

International Search Report and Written Opinion—PCT/EP2020/070342—mailing date Oct. 14, 2020.
(Continued)

*Primary Examiner* — Galen H Hauth
*Assistant Examiner* — Mohamed K Ahmed Ali
(74) *Attorney, Agent, or Firm* — Banner & Witcoff, Ltd.

(57) ABSTRACT

A method and system for manufacturing one or more three-dimensional porous structures (10). Filaments (2) are deposited on a support in a predetermined interconnected arrangement in a plurality of stacked layers (11) for forming one or more porous structure with interconnected pores (15). A nozzle head (30) with a plurality of nozzles (20) is used for depositing filaments. The plurality of nozzles are spaced apart from each other with a predetermined spacing therebetween. Each nozzle has an opening area through which filaments are dispensed as the nozzle head is moved relative to the support. Multiple 3D porous structures are manufactured in parallel, using a subset of nozzles for each porous structure, each subset of nozzles including at least one nozzle. Neighboring subsets of nozzles are distanced in
(Continued)

order to provide a working area on which the relevant porous structure of the plurality of porous structures is manufactured.

13 Claims, 8 Drawing Sheets

(51) Int. Cl.
  *B29C 64/209* (2017.01)
  *B29C 64/241* (2017.01)
  *B29C 64/245* (2017.01)
  *B33Y 10/00* (2015.01)
  *B33Y 30/00* (2015.01)

(52) U.S. Cl.
  CPC .......... *B29C 64/241* (2017.08); *B29C 64/245* (2017.08); *B33Y 10/00* (2014.12); *B33Y 30/00* (2014.12)

(56) References Cited

U.S. PATENT DOCUMENTS

| | | |
|---|---|---|
| 2017/0259507 A1 | 9/2017 | Hocker |
| 2017/0368758 A1 | 12/2017 | Touma |
| 2018/0370117 A1* | 12/2018 | Gardiner ................ B33Y 30/00 |
| 2019/0168300 A1 | 6/2019 | Gelbart |
| 2022/0064481 A1* | 3/2022 | Rodriguez ............ B29C 64/106 |
| 2022/0242072 A1* | 8/2022 | Nagabandi .......... B29C 71/0009 |
| 2022/0257365 A1* | 8/2022 | Choi ...................... A61L 27/16 |

FOREIGN PATENT DOCUMENTS

| | | | |
|---|---|---|---|
| EP | 2883685 A1 * | 6/2015 | ......... B29C 67/0055 |
| EP | 3476898 A1 | 5/2019 | |
| EP | 3486068 A1 | 5/2019 | |
| NO | 2017100783 A1 | 6/2017 | |
| RU | 2676989 C1 | 1/2019 | |
| WO | 2015147939 A1 | 10/2015 | |
| WO | 2017100853 A1 | 6/2017 | |
| WO | 2018081154 A1 | 5/2018 | |
| WO | 2019023119 A1 | 1/2019 | |
| WO | 2019068685 A1 | 4/2019 | |

OTHER PUBLICATIONS

International Search Report and Written Opinion—PCT/EP2020/070384—mailing date Oct. 12, 2020.
International Search Report and Written Opinion—PCT/EP2020/070354—mailing date Sep. 28, 2020.
International Search Report and Written Opinion—PCT/EP2020/070356—mailing date Sep. 29, 2022.

* cited by examiner

METHOD AND SYSTEM FOR MANUFACTURING THREE-DIMENSIONAL POROUS STRUCTURES

CROSS-REFERENCE TO RELATED APPLICATIONS

This application is a U.S. National Stage application under 35 U.S.C. § 371 of International Application PCT/EP2020/070342 (published as WO 2021/013745 A1), filed Jul. 17, 2020, which claims the benefit of priority to Application EP 19187334.8, filed Jul. 19, 2019. Benefit of the filing date of these prior applications is hereby claimed. Each of these prior applications is hereby incorporated by reference in its entirety.

FIELD OF THE INVENTION

The invention relates to a method and system for manufacturing one or more three-dimensional porous structures. The invention further relates to a computer program product for carrying out the method according to the invention.

BACKGROUND TO THE INVENTION

Additive manufacturing is currently widely used and various techniques exist. Additive manufacturing is a suitable technique for building a structure layer-by-layer and the manufactured structure can be employed in various applications.

Extrusion-based additive manufacturing methods have been employed for fabrication of porous structures. A material (e.g. a viscous paste, a meltable polymer, a hydrogel, etc.) is extruded through a nozzle in the form of filaments. A certain arrangement of filaments can be obtained by relative movement of the nozzle with respect to a print bed during deposition. During the material extrusion, filaments are extruded from a nozzle and positioned relative to one another according to a predetermined pattern providing the desired properties of the manufactured porous structure. The lay-down pattern is determined by the print path and has major impact on the shape and properties of the printed structure. In this way, complex geometries and porous structures can be obtained with a fully interconnected network of internal pores which are accessible from the outside, and which may be required for some applications.

The existing systems and methods can be rather slow and inefficient to implement for mass production of porous structures. There is a need for improving the speed of the printing process of porous structures manufactured by an extrusion based printing process. It is desired to obtain a system capable of increasing the speed with which 3D structures can be printed without significantly increasing costs and ecologic footprint. Furthermore, there is a desire to provide a process and device suitable for printing porous structures for a wider range of applications.

SUMMARY OF THE INVENTION

It is an object of the invention to provide for a method and a system that obviates at least one of the above mentioned drawbacks.

Additionally or alternatively, it is an object of the invention to improve the additive manufacturing process for three-dimensional porous structures, in particular to improve the speed of such a process.

Additionally or alternatively, it is an object of the invention to improve the efficiency of an extrusion based additive manufacturing process for fabricating porous structures.

Thereto, the invention provides for a method for manufacturing one or more three-dimensional porous structures, wherein filaments are deposited on a support in a predetermined interconnected arrangement in a plurality of stacked layers for forming one or more porous structure with interconnected pores, wherein a nozzle head with a plurality of nozzles is used for depositing filaments, the plurality of nozzles being spaced apart from each other with a spacing therebetween, wherein each nozzle has an opening area through which filaments are concurrently dispensed as the nozzle head and support are moved relative to each other, wherein a plurality of three-dimensional porous structures are manufactured concurrently using a subset of nozzles for each porous structure, each subset of nozzles including at least one nozzle, wherein each subset of nozzles carries out a corresponding relative movement for deposition of the filaments, and wherein neighboring subsets of nozzles are distanced in order to provide a working area on which the relevant porous structure of the plurality of porous structures is manufactured.

It is to be understood that the nozzle head and the support can be moved relative to each other, at least in X- or Y-direction, and in Z-direction to permit building a three dimensional object.

The multiple nozzle arrangement provides an additive manufacturing process for three-dimensional porous structures with an improved efficiency, as multiple filaments can be printed simultaneously using the multiple nozzles. Optionally multiple three-dimensional porous structures can be printed simultaneously. Thereby the three-dimensional porous structure may differ from each other, but preferably they are the same, i.e. they are similar. Moreover, also the printing quality can be significantly enhanced. For instance, a better control over the filaments interspacing or filament-to-filament distance can be obtained when compared to a single nozzle process.

The nozzle head may include a body on which the plurality of nozzles are arranged. Many variants are possible. It is also possible that a frame is used holding the plurality of nozzles. The nozzles may be separate units or may be integrated within a body of the nozzle head, for instance formed by a plurality of openings in a wall of the body of the nozzle head. According to a different embodiment, the nozzles may be mounted on a frame which extends either in one, two or three dimensions.

Optionally, the plurality of nozzles are moved together by means of moving the nozzle head. Thereby optionally, the form of the print path along which the plurality of nozzles is moved is the same or similar for all nozzles of the plurality of nozzles. Additionally or alternatively, the plurality of nozzles may be independently moveable with respect to each other. In an example, the nozzles are connected to the nozzle head, and the relative movement between the plurality of nozzles and the support is achieved by moving the nozzle head resulting in the multiple nozzles being moved together by the corresponding movement of the nozzle head. Such a method is suitable for the concurrent manufacturing of a large number of three-dimensional porous structures with the same shape.

A build material (e.g. paste, suspension, etc.) can be extruded through the multiple nozzles of the nozzle head for three-dimensional filament deposition. The deposited filaments can form a layered network. The layers may for instance be successively printed on top of each other, resulting in a structure formed by a stack of successive layers. The filaments are spaced apart with respect to each other, according to the spacing of the nozzles, in order to define channels therebetween. A porous structure with pores can thus be obtained in this way.

Advantageously, the productivity of 3D-extrusion can be significantly increased by increasing the amount of nozzles used, instead of employing a single nozzle which is fed by a material (e.g. paste) reservoir The layerwise deposition of the filaments may include extruding a material through a (deposition) nozzle to form the filaments while moving the deposition nozzle and the support or print bed relative to each other. The nozzle can be moved with respect to the support, and/or vice versa. Hence, it will be appreciated that kinematic inversions are also envisaged.

Different types of porous structures can be obtained. Structures obtainable with the method of this invention may represent a mesh, a lattice structure, a filament network, a scaffold, a filament framework, or the like. Many types of arrangements and structures are possible. The specific arrangement of the filaments defining the structure of the porous structure may be selected based on the application. Furthermore a larger number of porous structures or objects can be manufactured in a single printing process, such that the efficiency can be improved.

Optionally, the nozzle head is provided with at least one array of nozzles with spaced nozzles successively next to each other. The spacing between successive nozzle openings of the array of nozzles enables deposition of several filaments at a distance from each other within one layer, in a non-overlapping way. Furthermore, it can be better guaranteed that all produced porous structures have a same design when a single movable nozzle head is used holding the plurality of nozzles. In a further step, further filaments may be positioned there between, for example in case a 3D object is to be produced, wherein the distance between the filaments is smaller than the distance between the nozzles. According to another embodiment, filaments may be deposited with the array of nozzles extending in a different orientation during relative movement between the nozzle head and the support. A combination of the afore-mentioned arrangements may be provided as well.

In at least one orientation of the array of nozzles, a non-overlapping deposition may be provided. For example, a deposition of parallel distanced filaments may be obtained at least when the array of nozzles is transversally orientated during relative movement between the nozzle head and the support. A line going through center points of the nozzle openings of the array of nozzles may for instance be transverse to a relative moving direction between the nozzle head and the support. In other orientations, still an interspacing may be provided between neighboring parallel filaments.

Optionally, the nozzles of the nozzle head and the support are selectively rotated with respect to each other for adjusting an interspacing between neighboring filaments deposited by the nozzle head.

This can be done when printing a same layer for providing fibers with different orientations within a single layer. It is also possible to perform this when depositing a next layer on a previous layer. The spacing in one or more layers can be adjusted by selectively rotating the nozzle head with respect to the relative moving direction between the nozzle head and the support.

As a result of the relative rotation, the distance of deposition paths of the plurality of nozzles can be adjusted, resulting in a different filament-to-filament distance. This way a set of filaments may be deposited between an earlier deposited set of filaments, in such a way that filaments deposited by a first array are alternated with filaments deposited by a second array.

According to a different embodiment, the array of nozzles may be selectively rotated for reducing the distance between deposition paths of the neighboring nozzles. Rotation will usually be in a direction transverse to the moving direction, for example when depositing filaments in X-direction, distance between adjacent filaments may be reduced by rotating the nozzle array around an axis which extends in Y- or Z-direction. If the nozzles are arranged next to each other in a straight line, the distance between the neighboring deposition paths may be maximum when the nozzle array is transverse to the relative moving direction.

The selective relative rotation between the support and the nozzle head or nozzles of the nozzle head can be achieved in different ways. For example a turning table may be employed. Additionally or alternatively, a turning nozzle head or turning nozzles are employed.

Optionally, the at least one array of nozzles is positioned at an angle with respect to a relative moving direction between the nozzle head and the support, wherein the angle is adjusted based on a desired porosity of the porous structure. The nozzles may be orientated to a position under an oblique angle with respect to the moving direction in order to obtain a different distance between deposition paths of neighboring nozzles. In this way the filament-to-filament distance can be reduced resulting in a reduced porosity. This can be done locally, for achieving a reduced porosity (or increased density) locally in the porous structure. In this way, the local strength of the porous structure can be changed.

Optionally, the spacing between neighboring nozzles is in a range between 0.01 to 200 mm, more preferably between 0.05 to 100 mm, but other spacings considered suitable by the skilled person may be used as well depending on the nature of the 3D structure to be printed. The spacing allows for non-overlapping deposition of filaments, such that porous structures can be printed in a simple and cost-effective way. The spacing of the nozzles may be a shortest distance between an outer edge of neighboring nozzles.

Advantageously, the continuous streams of build material are separated with respect to each other and contact between adjacent filaments dispensed through the nozzle openings may be avoided. A continuous stream of build material can emerge from each nozzle of the plurality of nozzles of the nozzle head. By employing non-overlapping different deposition paths of the nozzles in the at least one running direction between the nozzle head and the support (e.g. print bed), a non-continuous layer of build material can be applied including a plurality of deposited filaments. A porous structure can be formed by the superposition of subsequent layers of build material, wherein the filaments in subsequent layers extend in different directions. The porosity can be obtained by the non-uniform distribution of build material.

Optionally, the spacing between neighboring nozzles is in a range between 0.01 to 30 times the nozzle diameter, more preferably between 0.1 to 20 times the nozzle diameter, even more preferably 0.5 to 15 times the nozzle diameter, in particular between 1 and 5 times the nozzle diameter. It will be appreciated that the diameter can relate to a characteristic length, such an opening dimension.

The spacing between adjacent nozzles can be selected in order to enhance the structural arrangement of the porous object being manufactured. The spacing between adjacent nozzles may be fixed or it may be variable.

The plurality of nozzles may be configured to provide filament deposition paths being arranged in at least one linear array. During deposition, the plurality of deposition paths may be next to each other.

Optionally, the nozzle head is provided with a plurality of nozzle arrays distanced with respect to each other.

One array may be offset from another array. Optionally, the plurality of nozzles are staggered with respect to each other.

Optionally, the nozzle head includes at least a first array of nozzles and a second array of nozzles, wherein neighboring arrays are offset at an array pitch being a distance of a first line going through center point of nozzle openings of a first array to a second line going through center points of nozzle openings of a second array.

The nozzles of the array of nozzles may be arranged such that filament deposition paths are non-overlapping during deposition of the filaments in one layer.

Optionally, filaments are deposited in an at least partially overlapping manner. In this way, a three-dimensional structure may be formed more quickly. For example, a plurality of stacked layers can be deposited with a single deposition stroke.

Optionally, a single porous structure is manufactured, simultaneously using the plurality of nozzles of the nozzle head.

The nozzles may be used for depositing a plurality of filaments concurrently for a single porous structure. The nozzle spacing seen from the relative moving direction affects the distance between deposited filaments. A plurality of three-dimensional porous structures may be manufactured in series using the plurality of nozzles.

Optionally, a plurality of three-dimensional porous structures are manufactured concurrently, using a subset of nozzles for each porous structure, each subset of nozzles including at least one nozzle, wherein each subset of nozzles carries out a corresponding relative movement for deposition of the filaments.

A large number of porous structures can be easily manufactured concurrently with improved quality (same movement of nozzle head) and efficiency. Also, it can be better guaranteed that all produced porous structures have a same design when a single movable nozzle head is used holding the plurality of nozzles.

Neighboring subsets of nozzles are distanced in order to provide a working area on which the relevant porous structure of the plurality of porous structures is manufactured. The distance between neighboring subsets may be the same or different, depending on whether neighboring subsets are provided for manufacturing the same or different porous structures.

Optionally, nozzles are arranged to selectively dispense filaments, the nozzles having preferably an adjustable flow rate for discharging medium. Adjusting the mass flow through the nozzle opening affects the thickness of the filaments.

Optionally, at least two subsets of the plurality of nozzles are arranged for deposition of filaments made out of different build materials, wherein a first subset is in fluid communication with a first reservoir containing a first material and the second subset is in fluid communication with a second reservoir containing a second material. In this way, one or more multi-material porous structures can be manufactured efficiently.

Optionally, a single successive layer is provided by performing one or more runs in at least one running direction of the nozzle head.

Optionally, the nozzle head and the support are selectively adjusted in accordance with a desired path for forming the porous structure.

Optionally, the nozzle head includes means for maintaining build material within the nozzle head at a desired temperature until the build material is dispensed from the nozzle head for deposition of the filaments.

According to an aspect, the invention provides for a system for manufacturing one or more three-dimensional porous structures, the system comprising:
a support,
a deposition unit, and
a controller configured to operate the deposition unit for deposition of filaments on the support in a predetermined interconnected arrangement in a plurality of stacked layers for forming one or more porous structures with interconnected pores, and
wherein the deposition unit includes a nozzle head with a plurality of nozzles for depositing filaments, the plurality of nozzles being spaced apart from each other, wherein each nozzle has an opening area through which filaments are dispensed as the nozzle head and the support are moved relative to each other, wherein the system is configured to manufacture a plurality of three-dimensional porous structures concurrently, using a subset of nozzles for each porous structure, each subset of nozzles including at least one nozzle, and wherein each subset of nozzles is configured to carry out a corresponding relative movement for deposition of the filaments, and wherein neighboring subsets of nozzles are distanced in order to provide a working area on which the relevant porous structure of the plurality of porous structures is manufactured.

Optionally, the subsets of nozzles are configured to manufacture similar porous structures.

According to an aspect, the invention provides for an arrangement including multiple systems for carrying out the steps of the method according to the invention, wherein the arrangement further includes a tray configured for handling printing porous structures. The tray may be automatically operated by means of a controller.

Advantageously in case one or more nozzles operate incorrectly (e.g. blockage, too much deposition of build material, etc.) other porous structures being manufactured are not affected by the incorrectly manufactured porous structures and the printing process can be continued regardless of some porous structures being manufactured incorrectly. As a result, a faster printing process can be achieved.

Furthermore, it can be better guaranteed that all produced porous structures have a same design when a single movable nozzle head is used holding the plurality of nozzles. Therefore, also a more cost-effective design can be obtained.

According to an aspect, the invention provides for a computer program product configured for performing, when run on a controller, the steps of the method according to the invention.

It will be appreciated that the invention provides for various nozzle systems and arrangement, such as for example single nozzle system, double nozzle system, multi nozzle system, an array nozzle system, multi array nozzle system and eventually mixed single and array nozzle system.

It will be appreciated that any of the aspects, features and options described in view of the method apply equally to the system and the described computer program product and controller. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
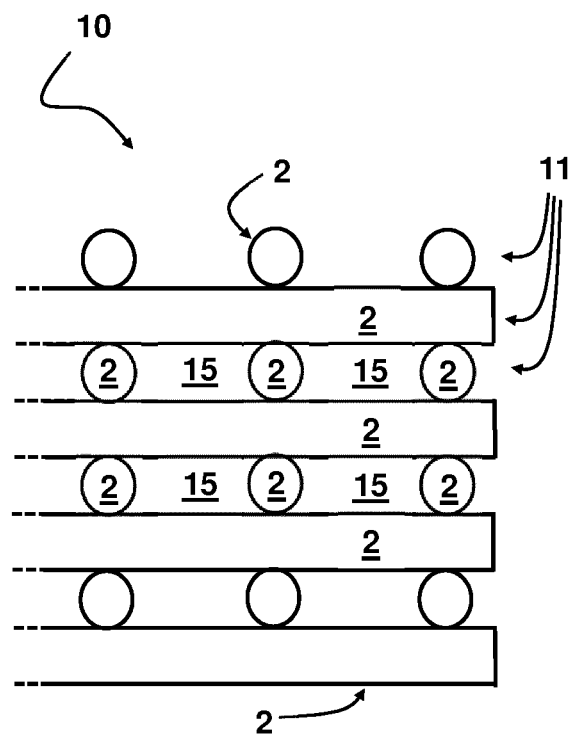
FIG. 1 shows a schematic diagram of an embodiment of a porous structure.

FIG. 1 shows a cross sectional side view of a schematic diagram of an embodiment of a porous structure 10 with a plurality of layers 11 of deposited filaments 2 stacked on each other. The filaments 2 have a filament diameter D and an filament interspacing A, i.e. filament-to-filament distance. In this example, the filament-to-filament distance A is kept constant in the filament arrangement. However, it is also envisaged that a varying filament-to-filament distance can be employed. A layer may have a height H. This height may correspond substantially to the filament diameter D. However, variations are also possible.

A build material can be extruded in the form of a first layer, the first layer including a plurality of filaments 2. The filaments 2 may for instance be part of an elongated strand of deposited build material. In an example, the elongated strand is deposited continuously. However, a non-continuous deposition is also possible. Furthermore, one or more additional layers can be extruded, each additional layer being vertically stacked upon a previously extruded layer and also comprising a plurality of filaments 2 angled with respect to a number of filaments 2 of the previous layer. A predetermined pattern is dispensed so as to define the three-dimensional object being manufactured.

The porous structure 10 has pores 15 which are interconnected such that mass transfer for a wide range of applications can be ensured. The geometry and arrangement of the filaments 2 affect the porosity and the mechanical properties of the porous structure. The position and orientation of filaments 2 in the filament arrangement, i.e. lay-down pattern obtained by deposition along the print path, is adapted to form one or more frangible regions 7 in the porous structure 10. The filament-to-filament distance A (i.e. interspace) may be obtained by means of the particular deposition process.

The 3D porous structure 10 is manufactured by employing the method according to the present invention. Accordingly, filaments are deposited on a support in a predetermined interconnected arrangement in a plurality of stacked layers 11 for forming the porous structure with interconnected pores 15. For this purpose, a nozzle head is employed for depositing the filaments making up the porous structure 10. The nozzle head includes a plurality of nozzles which are spaced apart from each other with a (predetermined) spacing therebetween. Each nozzle has an opening area through which filaments are concurrently dispensed as the nozzle head is moved relative to the support.

Figure 2A:
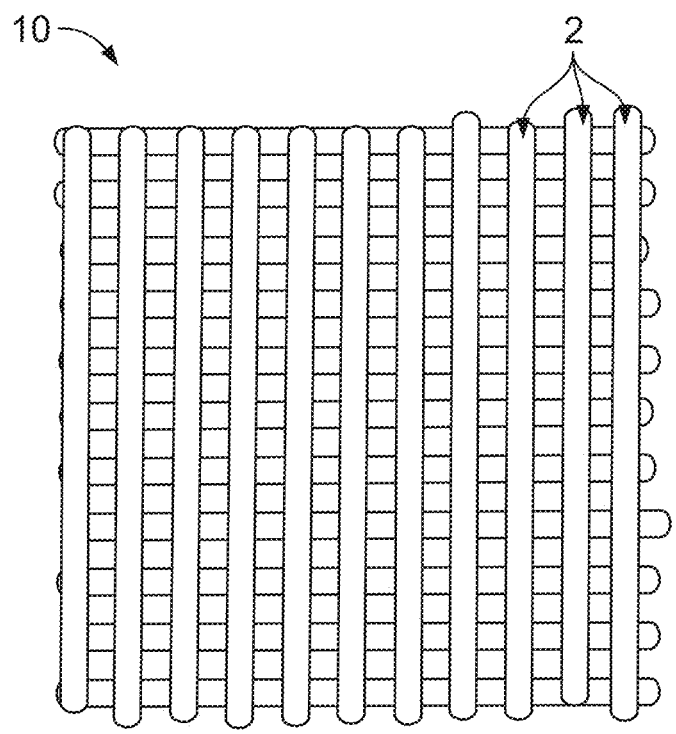
FIG. 2 shows a schematic diagram of an embodiment of a porous structure.
Figure 2B:
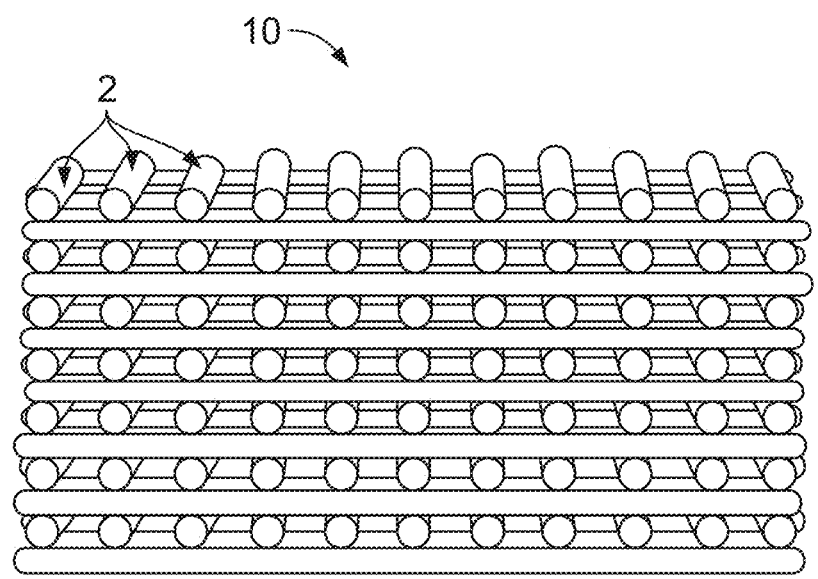

FIG. 2 shows a schematic diagram of an embodiment of a porous structure 10. FIG. 2A shows a top view and FIG. 2B shows a side view. By means of the plurality of nozzles the productivity can be increased.

In this example, the porous structure is obtained by means of a three-dimension fiber/filament deposition technique. In this additive manufacturing technique, a highly loaded paste can be extruded by moving nozzles. By computer controlling the movement of the extrusion head in x, y and z-direction, a porous material can be produced layer by layer. After drying, the porous material can be optionally thermally treated (calcination and sintering). Advantageously, the degree of freedom with regard to the porous parameters (fibre thickness, interfibre distance and stacking design) can be improved.

For example, first highly viscous ceramic (or metallic) paste may be provided. Then, the paste can be extruded through the thin nozzles of the scan head. A controller can be provided for controlling the deposition of the filaments or fibers. This can be followed by drying and calcination, and further optionally by sintering. As a result, a ceramic (or metallic) porous structure can be obtained.

Optionally, it is guaranteed that no large particles are present in paste, which can be detrimental to the operation of the printing process. Therefore the particle size of the starting material can be checked. If too large particles are present the powder may be sieved to obtain a desired particle size. Optionally, the largest particle (represented by the d99 value) can be chosen to be at least five times smaller than the nozzle size that is used, preferably ten times smaller. This can significantly improve the printing process.

In a following step the powder can be mixed together with a solvent (water), binder and additives, thus obtaining a viscous paste. A good mixing to achieve a homogenous paste (minimizing agglomerates or the incorporation of air bubbles) can be a prerequisite for a smooth and reproducible process. The powder loading of the functional material can depend on the specific surface area, the particle size distribution and/or the powder morphology. As the particle size of the powder decreases, the viscosity of the paste may increase. Therefore the solid loading can be effectively lowered for such powders. Apart from organic binder(s), rheology modifiers can be added to control the rheological behaviour of the paste. In some cases a defoamer can also be added to avoid air bubbles in the paste.

After mixing and de-airing, the paste can be transferred to the paste reservoir and mounted on a 3D filament deposition set-up. The nozzle, either plastic or metal (e.g. below 200 µm), can be attached to the paste reservoir. Paste extrusion can be achieved by a displacement pump or a screw pump. During deposition, it might be necessary to control the drying conditions. After drying at room conditions (or under controlled atmosphere), the 3D fiber deposition structure can be calcined and sintered.

The filaments are deposited in a predetermined arrangement, providing an interconnected network which can include multiple stacked layers. In this way, a porous structure with interconnected pores can be obtained. Advantageously, this can be achieved utilizing a nozzle head with a plurality of nozzles for depositing filaments. The plurality of nozzles are distanced relative to each other with a predetermined gap (i.e. spacing) therebetween. Each nozzle includes an opening area through which filaments are concurrently dispensed as the nozzle head is moved relative to the support for printing the porous structure.

Figure 3:
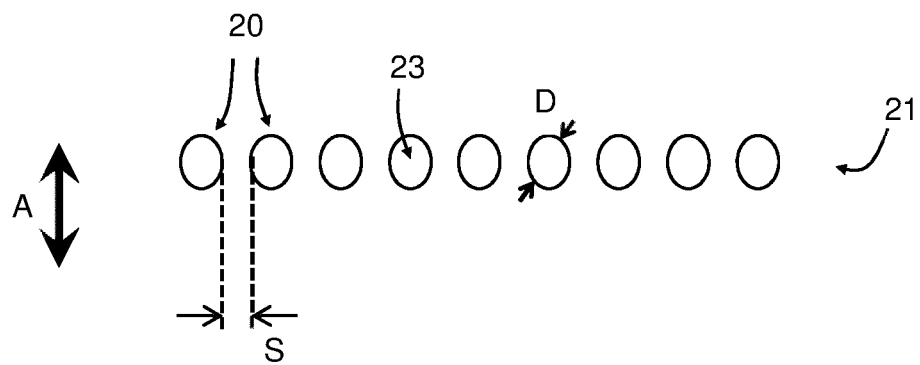
FIG. 3 shows a schematic diagram of a bottom view of an embodiment of nozzles.

FIG. 3 shows a schematic diagram of a bottom view of an embodiment of nozzles 20 arranged next to each other. In this example, the nozzles are arranged in an array 21, with the individual nozzles positioned next to each other. However, it will be appreciated that other arrangements are also possible.

The nozzles have a nozzle opening 23 with a diameter D through which the filaments are dispensed. The nozzles may be moved with respect to the support in a moving direction A. Other moving directions are also possible. It is also envisaged that the moving direction is changed during deposition of the filaments. The distance between two adjacent nozzles is the nozzle interspacing S seen in the moving direction.

Figure 4A:
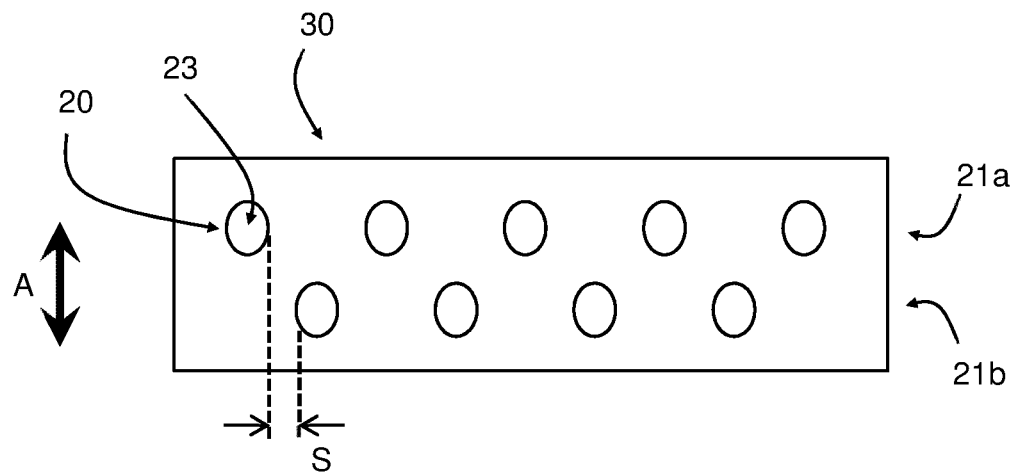
FIG. 4 shows a schematic diagram of a bottom view of embodiments of nozzle heads.
Figure 4B:
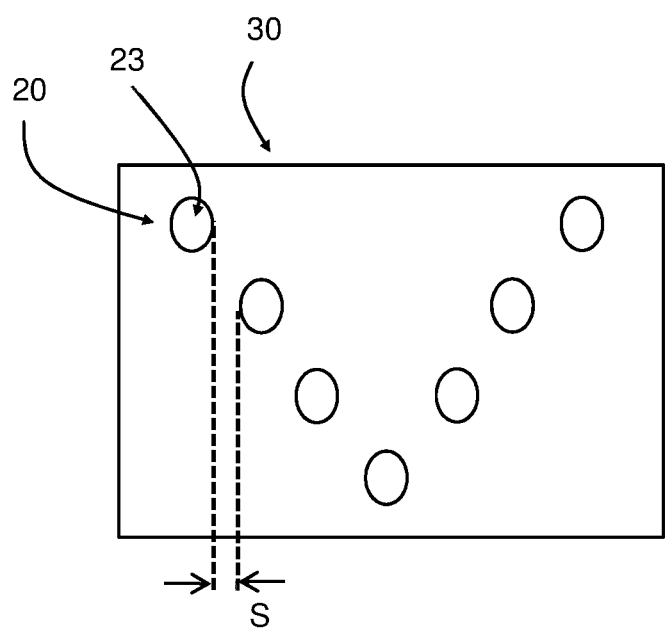

FIG. 4 shows a schematic diagram of a bottom view of embodiments of exemplary nozzle heads 30 including a plurality of nozzles 20 each having a nozzle opening 23 through which concurrently filaments can be discharged for forming one or more porous structures 10. The nozzle head 30 may form a body in which the plurality of nozzles 20 are integrated. Hence, the nozzles can be moved as a result of relative movement of the scan head 30 and the support on which the one or more porous structures 10 are manufactured. In FIG. 4A, the nozzles are arranged in a staggered arrangement. The nozzle head 30 includes two nozzle arrays, namely a first nozzle array 21a and a second nozzle array 21b. The nozzles are arranged such that the deposition paths of the nozzles remain distanced from each other. In FIG. 4B, the nozzle head 30 includes a plurality of nozzles 20 in a V-shaped arrangement. It will be appreciated that various other nozzle arrangements are also possible.

Figure 5A:
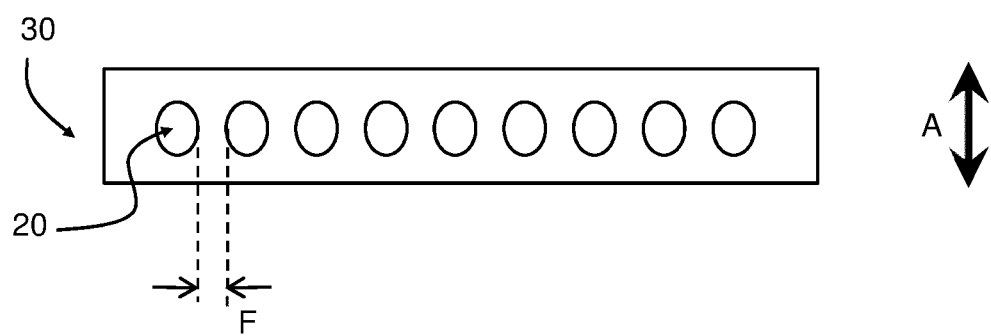
FIG. 5 shows a schematic diagram of an embodiment of a nozzle head.
Figure 5B:
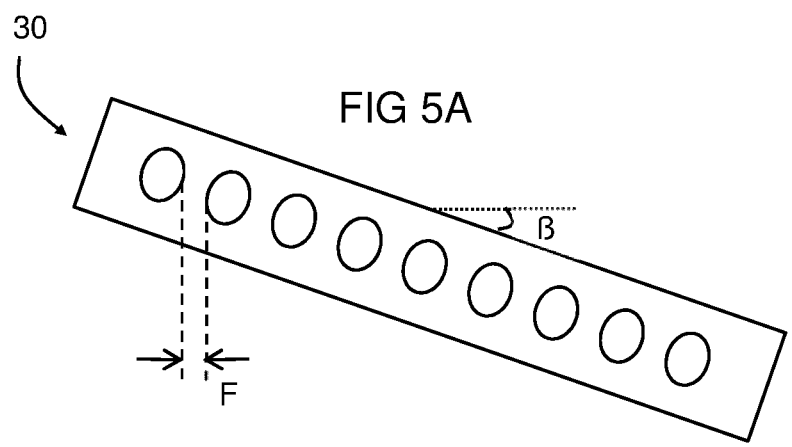
Figure 5C:
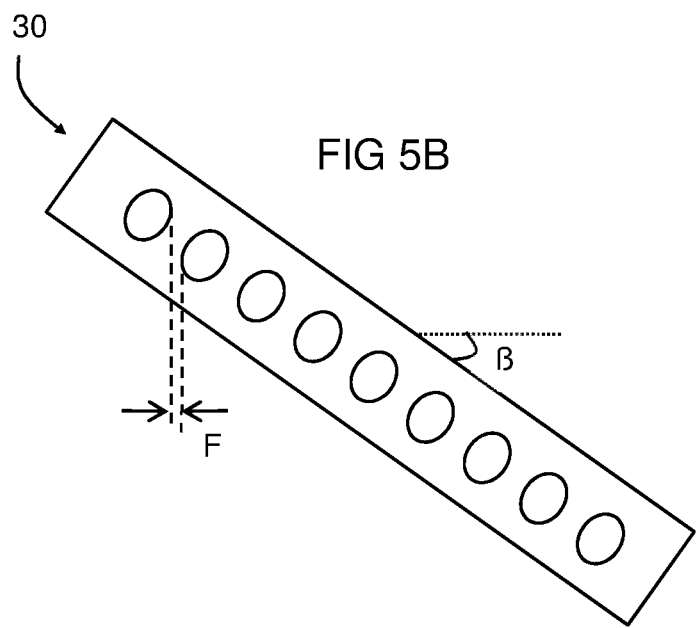

FIG. 5 shows a schematic diagram of an embodiment of a nozzle head 30 with a plurality of nozzles 20 each arranged for concurrently depositing filaments. The interspacing S between adjacent nozzles influences the distance between filament disposition paths of the nozzles. However, the distance between the filaments can be adjusted by changing the orientation of the arrangement of nozzles with respect to the relative moving direction between the nozzle head 30 and the support on which the porous structure 10 is manufactured.

In the shown embodiment of FIG. 5, the nozzles 20 of the nozzle head 30 and the support are selectively rotated with respect to each other for adjusting an interspacing F between neighboring filaments deposited by the nozzle head 30. The nozzle head 30 may for instance be moved in a moving direction A. In this example, an array of nozzles is positioned at an angle ß with respect to a relative moving direction A between the nozzle head and the support, wherein the angle ß is adjusted based on a desired porosity of the porous structure, as the filament interspacing F is adjusted.

FIG. 6 shows a side view of a schematic diagram of embodiments of systems 50 for manufacturing porous structures 10, 10i. The systems 50 include a support 60, a deposition unit 70, and a controller configured to operate the deposition unit 70 for deposition of filaments 2 on the support 60 in a predetermined interconnected arrangement in a plurality of stacked layers for forming one or more porous structures 10, 10i with interconnected pores. The deposition unit includes a nozzle head 30 with a plurality of nozzles 20 for depositing filaments 2, the plurality of nozzles 20 being spaced apart from each other. Each nozzle 20 of the nozzle head 30 has an opening area through which filaments 2 are dispensed as the nozzle head 30 is moved relative to the support 60.

Figure 6A:
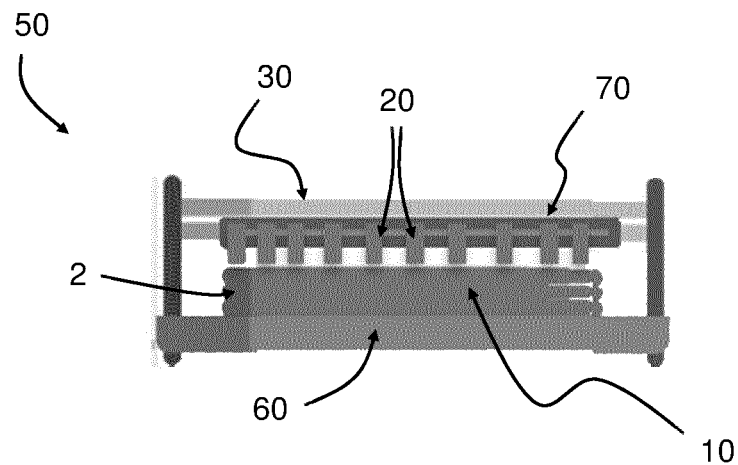
FIG. 6 shows a schematic diagram of embodiments of systems.

In FIG. 6A, the system is arranged to manufacture a single porous structure 10 simultaneously using the plurality of nozzles 20 of the nozzle head 30.

Figure 6B:
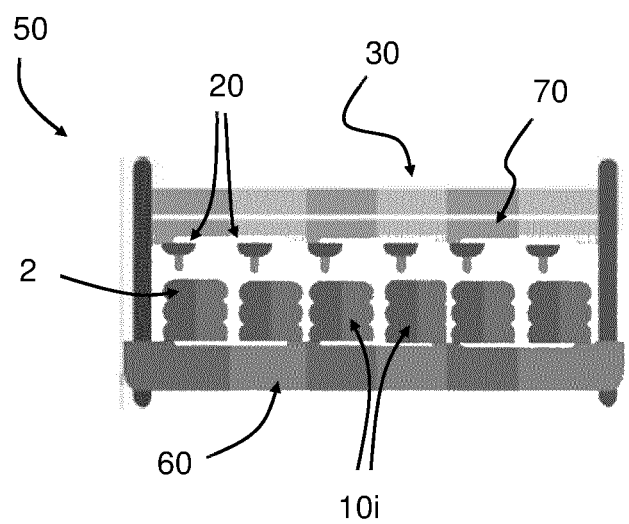

In FIG. 6B, a plurality of three-dimensional porous structures 10i are manufactured in parallel, using a subset of nozzles for each porous structure 10i, each subset of nozzles including at least one nozzle, wherein each subset of nozzles carries out a corresponding relative movement for deposition of the filaments. In this example, the subset of nozzles includes one nozzle.

FIG. 7 shows a schematic diagram of an embodiment of nozzle arrangements. The neighboring nozzles are distanced in order to provide a working area on which the relevant porous structure of the plurality of porous structures is manufactured. Optionally, all the produced porous structure have a same design.

In order to increase productivity, the amount of nozzles per platform can be increased. A platform may be used which is arranged to extrude filaments through at least two nozzles 20. The nozzles 20 could be aligned in a line or in three dimensions as shown in FIG. 7. The different nozzles 20 can be arranged to each print an individual porous structure 10. Therefore the distance between the nozzle heads can be larger than the maximal length in the direction where the nozzles are oriented.

The build material (e.g. paste) extruded through the nozzles 20 can come from at least one of a common reservoir for all nozzles 20, a part reservoir feeding part of the nozzles or a single paste reservoir for each nozzle. The build material can be fed to the nozzle using air pressure, a piston pump, or a screw. Other techniques may also be used. The build material can come from a reservoir with fixed volume or constantly be fed with for example a twin screw extruder. The build material volume extruded through each nozzle can be a fixed flow for all nozzles or different flow for each nozzles 20. In some examples, the build material rheology of the build material flowing through each nozzle can be identical. For example, each nozzle 20 can extrude an identical paste in rheology and composition or a different paste. In some examples, the build material flow for nozzles with different build material can be adjusted separately.

Advantageously, the manufacturing process can be faster due to more nozzles and lower cost due to the use of 1 XYZ table/programming unit. If a single nozzle goes into error (blockage, more paste deposition,) all other samples are not affected.

Figure 7A:
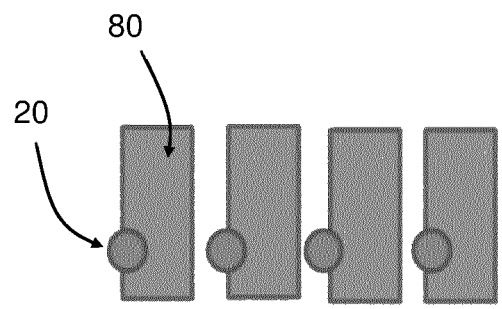
FIG. 7 shows a schematic diagram of an embodiment of nozzle arrangements.
Figure 7B:
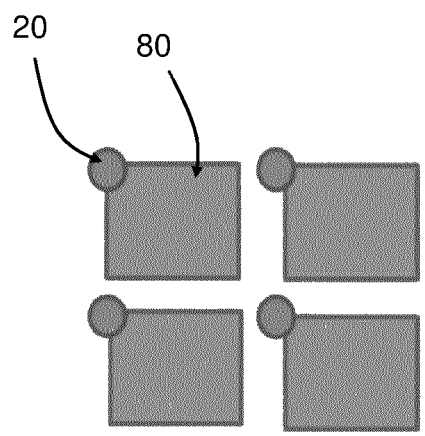

The nozzles are arranged next to each other in FIG. 7A, and in a matrix (i.e. 2 dimensional array) in FIG. 7B. Other nozzle arrangements are also possible. In some examples, the interspace between the nozzles can be changed, such that the area of the working area 80 can be changed. This may be done depending on the porous structure(s) to be manufactured. Optionally, the controller first determines the size of the porous structure to be manufactured, and subsequently adjusts the interspacing between the nozzles such as to obtain a size of a working area 80 based on the size of the porous structure to be manufactured. In this way, a more efficient use of the available space can be used.

Figure 8:
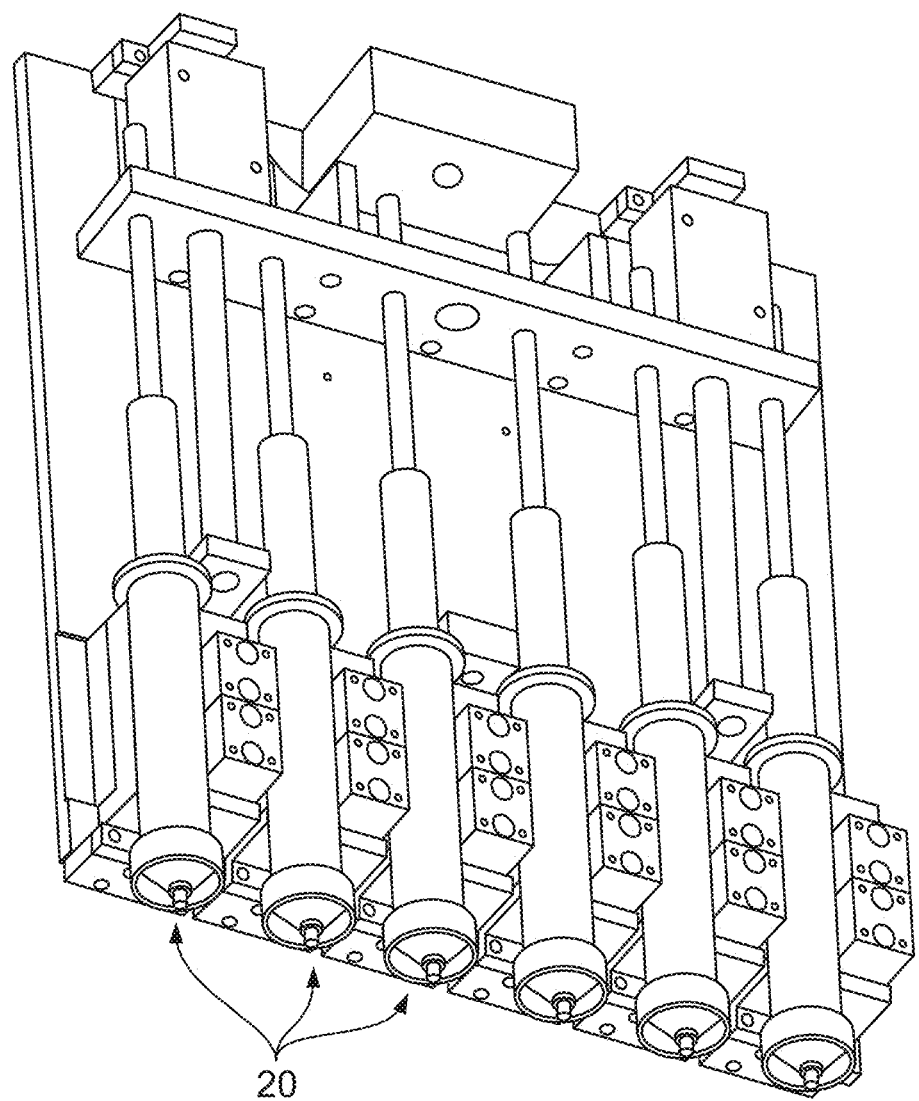
FIG. 8 shows a schematic diagram of an embodiment of a nozzle head.

FIG. 8 shows a schematic diagram of an embodiment of a nozzle head 30 with a multiple nozzle arrangement. A syringe pump is employed for extrusion of build material. However, other mechanisms for extruding build material can also be employed, for instance a screw extruder. The build material may for instance be prepared using a ceramic powder, a binder and solvent. Other build materials may also be used. In this example, the syringe pump drives six pistons/reservoirs of nozzles mounted on a movable platform.

The volumetric flow of build material may be the same for each nozzle. In this particle example, the nozzles have a diameter of 200 micrometer, a selected center distance of 250 micrometer, a writing speed of 1530 mm/min, and a flow rate of build material of 40 µL/min. The nozzles may be arranged for deposition of same filaments during printing. However, in some examples, the nozzles may be configured for deposition of different filaments during printing, for instance filaments with different diameters, a different material, etc. Also the distance between the filaments can be adjusted.

In some examples, printing is performed with two or more nozzles having different volumetric flows. For this purpose, the nozzles may have a variable volumetric flow. Optionally, the flow to the nozzle is adapted individually by regulating the air pressure feeding the screw. Other methods for controlling the flow are also envisaged.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A method for parallel manufacturing a plurality of three-dimensional porous lattice structures, the method comprising:

providing a nozzle head comprising a plurality of subsets of nozzles, each subset including at least one nozzle; and concurrently manufacturing, from each subset of nozzles, a respective one of said plurality of three-dimensional porous lattice structures having interconnected pores by moving the nozzle head and a support relative to each other, while depositing filaments through nozzles of each of said subsets of nozzles onto the support in a predetermined interconnected arrangement in a plurality of stacked layers;

wherein each subset of the plurality of subsets of nozzles is confined to a respective, non-overlapping working area for manufacturing each respective one of said plurality of three-dimensional porous lattice structures, without any filament deposited from one of said plurality of subsets of nozzles overlapping or contacting any filament deposited from another of said plurality of subsets of nozzles.

2. The method according to claim 1, wherein said moving the nozzle head and the support relative to each other comprises rotating the nozzle head and the support relative to each other for adjusting an interspacing between neighboring filaments deposited by the nozzle head.

3. The method according to claim 1, wherein at least one of said plurality of subsets of nozzles is positioned at an angle with respect to direction of said moving the nozzle head and the support relative to each other, wherein the angle is adjusted based on a desired porosity of said respective one of said plurality of three-dimensional porous lattice structures.

4. The method according to claim 1, wherein a spacing between neighboring nozzles of at least one of said plurality of subsets of nozzles is in a range between 0.01 to 30 times a nozzle diameter.

5. The method according to claim 1, wherein the subsets of nozzles of the nozzle head are distanced with respect to each other.

6. The method according to claim 1, wherein first and second subsets of the plurality of subsets of nozzles are offset at a pitch being a distance of a first line going through center points of nozzle openings of the first subset to a second line going through center points of nozzle openings of the second subset.

7. The method according to claim 1, wherein an interspace between nozzles of at least one subset of said plurality of subsets of nozzles is adjustable such as to adjust the respective, non-overlapping working area for the subset of the nozzles.

8. The method according to claim 7, wherein said interspace between nozzles is adjusted such as to adjust the respective non-overlapping working area based on a size of said respective one of said plurality of three-dimensional porous lattice structures.

9. The method according to claim 1, wherein a first subset of the plurality of subsets of nozzles deposits filaments of a first build material and a second subset of the plurality of subsets of nozzles deposits filaments of a second build material, different from said first build material.

10. The method according to claim 4, wherein the spacing between neighboring nozzles is in a range between 0.1 to 20 times the nozzle diameter.

11. The method according to claim 10, wherein the spacing between neighboring nozzles is in a range between 0.5 to 15 times the nozzle diameter.

12. The method according to claim 11, wherein the spacing between neighboring nozzles is in a range between 1 to 5 times the nozzle diameter.

13. The method according to claim 1, further comprising adjusting a flow rate of build material through one of said plurality of subsets of nozzles.

\* \* \* \* \*